United States Patent [19]
Smith, III

[11] Patent Number: 6,095,191
[45] Date of Patent: Aug. 1, 2000

[54] UNDERSEA HYDRAULIC COUPLING WITH TAPERED PROBE

[75] Inventor: Robert E. Smith, III, Missouri, Tex.

[73] Assignee: National Coupling Company Inc., Stafford, Tex.

[21] Appl. No.: 09/205,531

[22] Filed: Dec. 3, 1998

[51] Int. Cl.$^7$ .................................................. F16L 37/28
[52] U.S. Cl. .................. 137/614.04; 137/614; 251/149.7
[58] Field of Search ..................... 251/149.7; 137/614, 137/614.04

[56] References Cited

U.S. PATENT DOCUMENTS

| | | | |
|---|---|---|---|
| 3,054,422 | 9/1962 | Napolitano | 137/509 |
| 3,473,556 | 10/1969 | Johnson et al. | 137/322 |
| 3,508,580 | 4/1970 | Snyder | 137/614.04 |
| 4,445,536 | 5/1984 | Willis | 137/560 |
| 4,506,863 | 3/1985 | Quin et al. | |
| 4,597,413 | 7/1986 | Buseth | 137/614.04 |
| 4,694,859 | 9/1987 | Smith, III | 137/614.04 |
| 4,709,726 | 12/1987 | Fitzgibbons | 137/614.04 |
| 4,768,538 | 9/1988 | Mintz et al. | 137/15 |
| 4,796,922 | 1/1989 | Prichard | 285/26 |
| 4,813,454 | 3/1989 | Smith, III | 137/614.04 |
| 4,834,139 | 5/1989 | Fitzgibbons | 137/614.04 |
| 4,858,648 | 8/1989 | Smith, III et al. | 137/614.04 |
| 4,884,584 | 12/1989 | Smith | 137/614.04 |
| 4,900,071 | 2/1990 | Smith, III | 285/379 |
| 5,015,016 | 5/1991 | Smith, III | 285/108 |
| 5,052,439 | 10/1991 | Smith, III | 137/614.04 |
| 5,072,755 | 12/1991 | Wilcox | 137/614.03 |
| 5,232,021 | 8/1993 | Smith | 137/614.04 |
| 5,337,782 | 8/1994 | Wilcox | 137/614.03 |
| 5,355,909 | 10/1994 | Smith, III | 137/614.04 |
| 5,390,702 | 2/1995 | Smith, III | 137/614.04 |

FOREIGN PATENT DOCUMENTS 0 290 067   4/1988   European Pat. Off. .

*Primary Examiner*—A. Michael Chambers
*Attorney, Agent, or Firm*—Fulbright & Jaworski

[57] ABSTRACT

An undersea hydraulic coupling is disclosed having a male member with a tapered, frusta-conical surface and a female member with a tapered, frusta-conical bore. Before radial seals engage the frusta-conical surfaces, trapped seawater is expelled or displaced from the bore through the space between the coupling members, thereby preventing seawater from entering hydraulic lines.

12 Claims, 3 Drawing Sheets

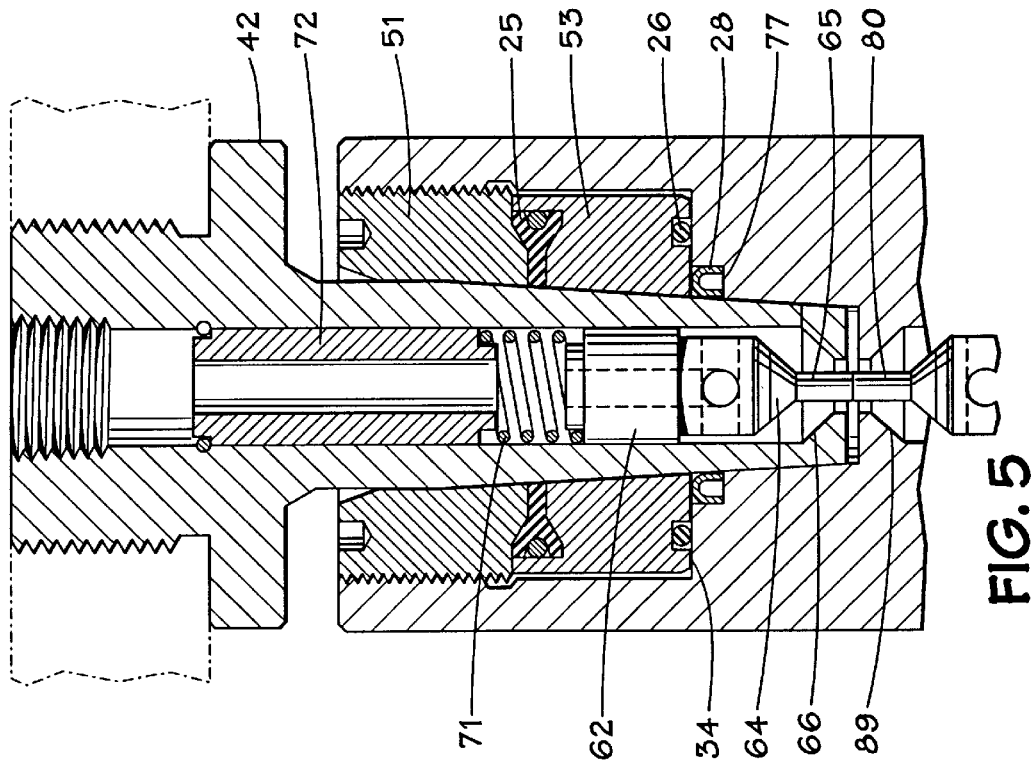
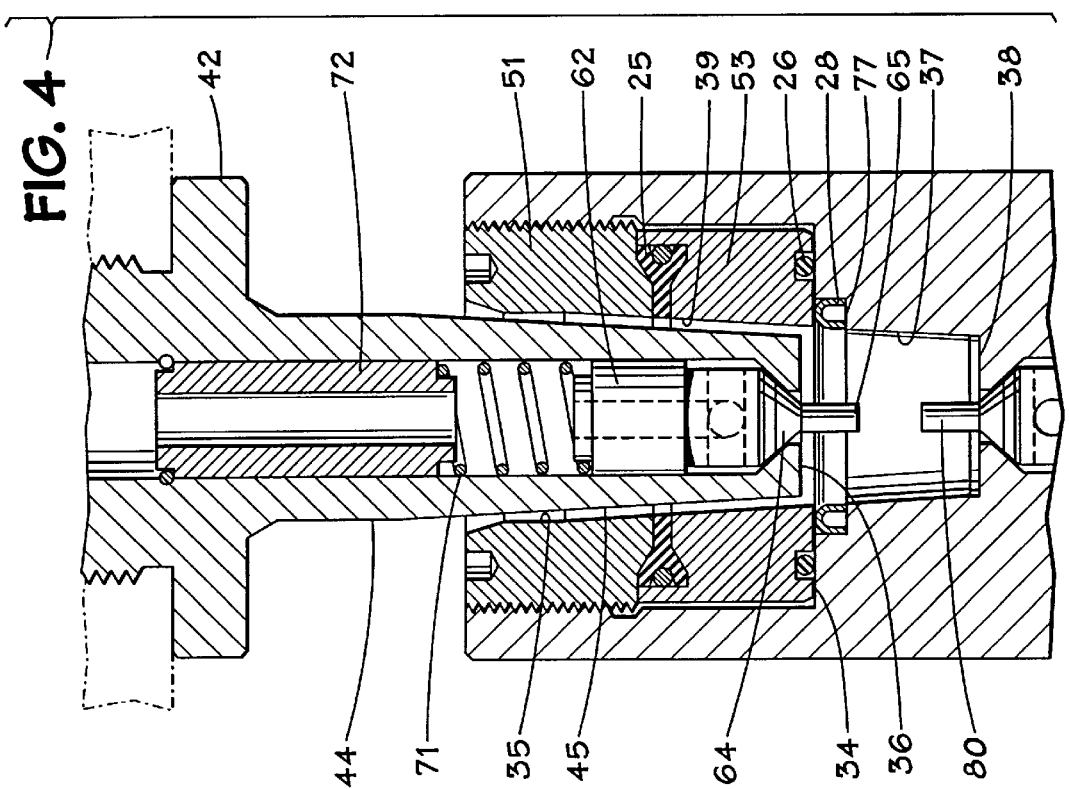

UNDERSEA HYDRAULIC COUPLING WITH TAPERED PROBE

BACKGROUND OF THE INVENTION

1. Field of the Invention

The present invention relates to hydraulic couplings used in undersea drilling and production applications and seals used in those couplings. More particularly, the invention involves an undersea hydraulic coupling with a tapered probe that will displace sea water from the cavity between the coupling members before radial seals engage the circumference of the probe.

2. Description of Related Art

Subsea hydraulic couplings are old in the art. The couplings generally consist of a male member and a female member with soft seals positioned within the female member to seal the junction between the male and female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either abut the end or face of the male member or engage the cylindrical probe wall about its outer circumference. The hydraulic fluid is then free to flow through the female and male members of the coupling, and seals prevent that flow from escaping about the joint and the coupling.

In some instances, a check or poppet valve may be installed in the female member and also in the male member. Each valve opens when the coupling is made up and closes when the coupling is broken so as to prevent fluid from leaking out of the system of which the coupling is a part.

In U.S. Pat. No. 4,694,859 to Robert E. Smith, III, assigned to National Coupling Co., Inc. of Stafford, Tex., an undersea hydraulic coupling and metal seal is disclosed. This patent provides an undersea hydraulic coupling with a reusable metal seal which engages the circumference of the probe when it is positioned within the female member bore. The metal seal is held in place by a retainer. When the male and female members of the coupling are parted under pressure, the retainer prevents the metal seal from blowing out through the bore of the female member.

When the male member of an undersea hydraulic coupling of the foregoing type is connected to the female member, while the couplings are subsea, sea water may be trapped in the bore and enter the hydraulic lines attached to the coupling members. During disconnection of the coupling members, when the male member is withdrawn from the female member bore, a low pressure area or vacuum may be created in the bore. This vacuum may urge the seal into the bore, and may increase the difficulty of disengaging the male from the female coupling member. A coupling design addressing these problems by including a passage for venting sea water into or out from the cavity while the male member is disengaging or engaging the female member is disclosed in U.S. Pat. No. 4,813,454 to Robert E. Smith III assigned to National Coupling Company, Inc. of Stafford, Tex.. The patent discloses an undersea hydraulic coupling with pressure balancing ports between the central bore of the female member and the outer surface of the body.

An improved undersea hydraulic coupling is needed having one or more seals around the circumference of the male member, and which displaces sea water that is trapped between the male and female members while the coupling is being assembled and before the seals engage the male member or probe.

SUMMARY OF THE INVENTION

The present invention resides in an undersea hydraulic coupling of the foregoing type including male and female members for fluid communication therebetween and valves for controlling fluid flow in each of the members. The present invention includes a male member, or probe, having a body with a tapered external diameter for mating with a female member bore having a tapered internal diameter. When the male member is inserted into the female member bore, a passage or space between the coupling members allows sea water to be displaced as the tapers close together, thus preventing or minimizing sea water from entering the hydraulic lines. Almost all of the sea water is displaced before the radial seals engage the bore of the female member and the outer circumference of the male member. The present invention provides for displacement of trapped sea water from the cavity between the male and the female members, thus helping to avoid or minimize hydraulic lock when the coupling members are being assembled or disassembled.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4 is a sectional view of a preferred embodiment of the present invention showing the male member partially inserted into the female member of the coupling.

FIG. 5 is a sectional view of a preferred embodiment of the present invention with the male member fully inserted into the female member of the coupling.

DETAILED DESCRIPTION OF PREFERRED EMBODIMENTS

Figure 1:
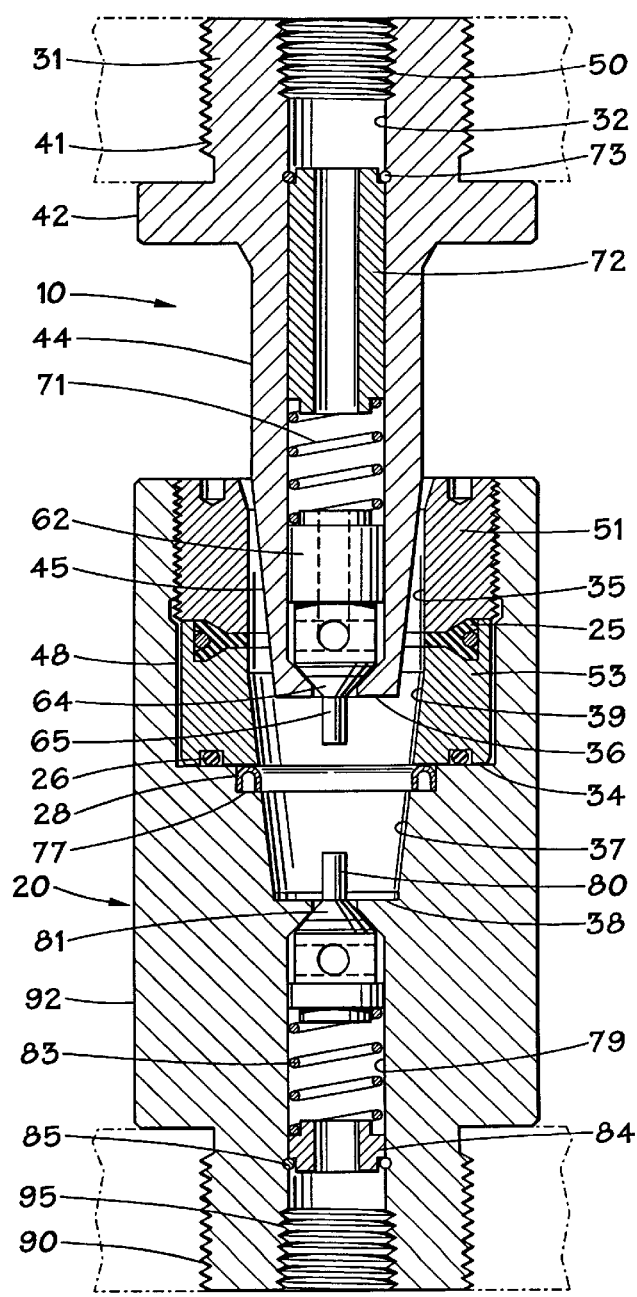
FIG. 1 is a sectional view of a preferred embodiment of the present invention showing the male member partially inserted into the female member of the coupling.
Figure 2:
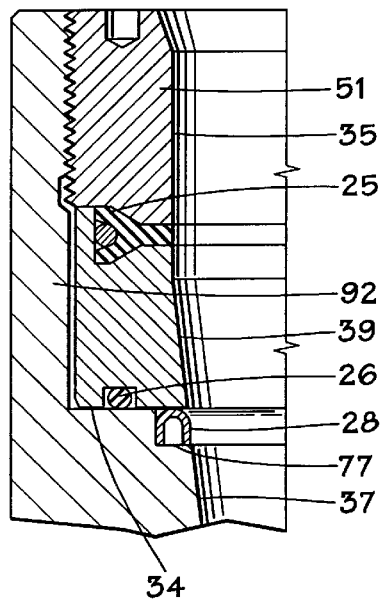
FIG. 2 is an expanded cross-section view of the seal and seal retainers according to a preferred embodiment of the present invention.

FIG. 1 shows male member 10 and female member 20 as the male member has been partially inserted into the female member bore. Male member 10 may be attached to a manifold plate with threads 41 or other means such as set screws. Female member 20 may be attached to a second manifold plate by threads 90 or other means. Techniques for attaching the members to such plates are well known to those skilled in the art.

Male member as shown in FIG. 1, comprises handle 31, flange 42 and a probe having first section 44 with a cylindrical diameter and second section 45 with a tapered diameter. Preferably, second section 45 is frusta-conical in shape. The body of the male member is also provided with a central bore 32. The bore may have a threaded section 54 to facilitate connection to a hydraulic line. Adjacent and inboard of the threaded section is a cylindrical passageway extending longitudinally within the male member and terminating at valve seat 66 which is an inclined shoulder. As shown in FIG. 1, the poppet valve assembly of the male member is slidably received within the central bore 32. Cylindrical hollow valve body 62 has an outer diameter dimensioned to slide within the cylindrical bore. Valve head 64 is conical in shape and seats on valve seat 66. Valve head 64 has a stem 65 or actuator extending therefrom. Helical valve spring 71 urges the valve head into a closed position against valve seat 66. Helical valve spring 71 is located within the cylindrical bore 32 and is held in place by spring collar 72 and collar clip 73.

Female member 20 includes central bore 79 having several variations in its diameter as it extends longitudinally or axially through the body of the female member. At a first end of central bore 79 is threaded internal passageway 95 for connection to a threaded hydraulic line. The threaded passageway of central bore 79 terminates at a cylindrical passageway which slidably receives a poppet valve assembly. This cylindrical passageway terminates at valve seat 89 for seating conical valve head 81. Inboard of the valve seat is frusta-conical bore 37 dimensioned to receive the frusta-conical or tapered second section 45 of male member 10. Adjacent the frusta-conical bore 37 is shoulder 77 for placement of a hollow pressure-energized ring-shaped metal seal thereon. The metal seal is preferably expandable in response to fluid pressure in its internal cavity to move radially outwardly against the female member bore and radially inwardly against the second section 45 of the male member. Retainer sleeve 53 is slidably inserted into the female member bore and rests against shoulder 34. The retainer sleeve may axially compress radial metal seal 28 slightly to pre-load the seal to extend slightly inwardly into the bore and engage the circumference of the second section 45 of the male member when the male member is inserted into the female member. A ring-shaped elastomeric seal or O-ring also may be in a face groove of the retainer sleeve to engage shoulder 34 of the female member. Retainer sleeve 53 is dimensioned to slide in bore 48 of the female member and is held in place by retainer 51 which is threaded to the female member. Retainer 51 may be tightened to the female member to allow axial compression of radial metal seal 28. Dove-tail seal 25 is positioned between the retainer sleeve and the retainer. The dove-tail seal may be an elastomeric seal for engaging either the second section 45 of the probe or male member, or the first cylindrical section 44 of the male member. In a preferred embodiment, the dove-tail seal engages the first cylindrical section 44 of the male member. Dove-tail seal 25, O-ring 26 and pressure-energized metal seal 28 are held in place in the female member bore by retainer sleeve 53 and retainer 51.

The valve assembly of the female member 28 comprises poppet valve head 81 which is slidably received within cylindrical passage 79 of the female member. Poppet valve head 81 has a generally conical shape for seating on valve seat 89, and a stem 80 or actuator extends from the valve head. To urge the valve into the closed position, helical valve spring 83 is mounted between the shoulder of the valve and spring collar 84. Collar clip 85 engaged with the female member bore holds the spring collar in place. The valves of the female member and the male member are preferably identical in components and function. When the actuators of the poppet valves contact one another, both valves may be forced into open positions for hydraulic flow between the male and female members.

Figure 3:
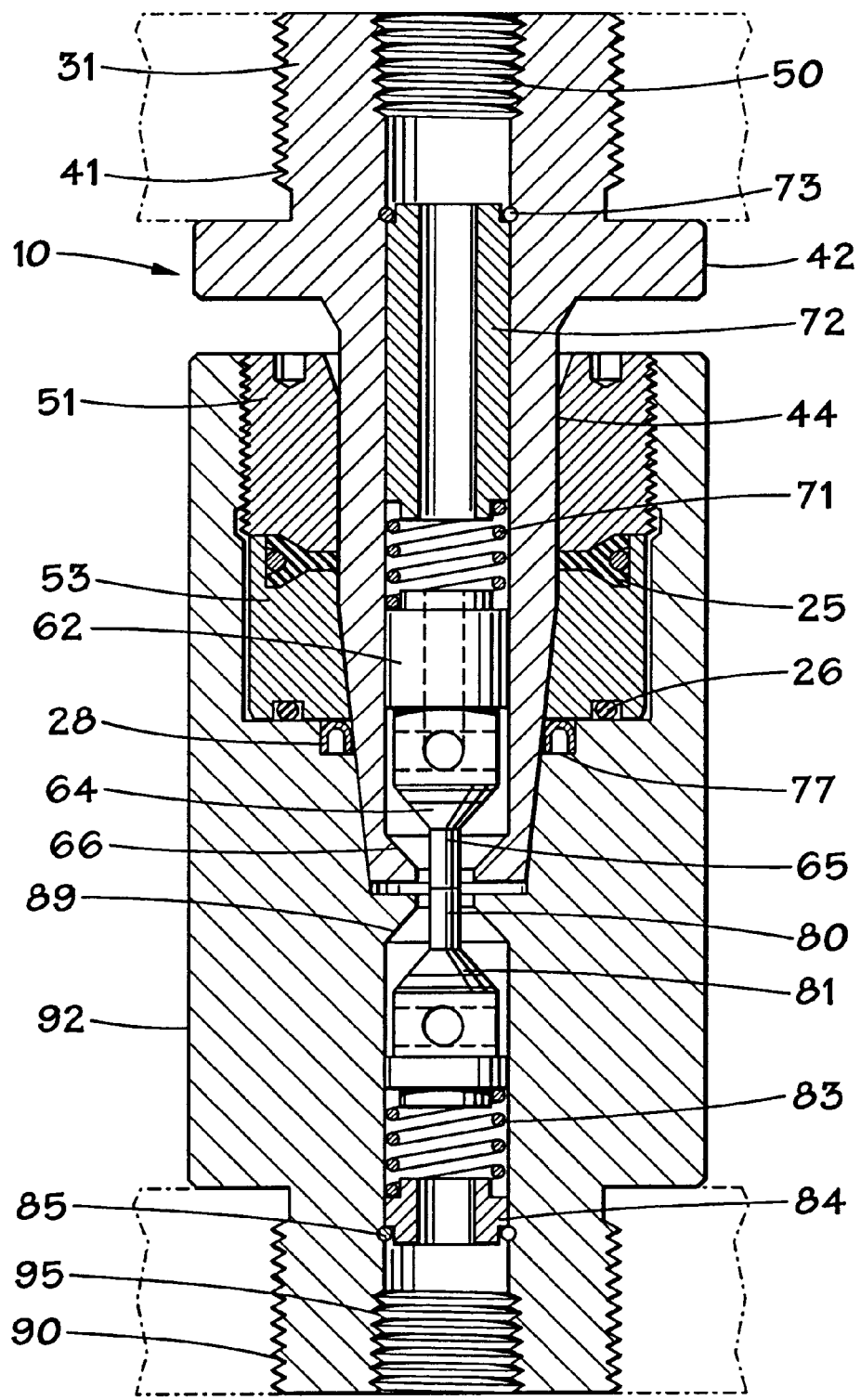
FIG. 3 is an sectional view of a preferred embodiment of the present invention showing the male member fully inserted into the female member of the coupling.

Retainer sleeve 53 preferably has a tapered or frusta-conical bore 39 extending therethrough for mating with the frusta-conical second section 45 of the male member or probe. Retainer 51 preferably has a cylindrical internal bore 35 extending therethrough. When the end face 36 of the male member approaches shoulder 38 in the female member bore, radial metal seal 28 engages the frusta-conical second section 45 of the male member, while dove-tail seal 25 engages the cylindrical circumference of the male member or probe, as shown in FIG. 3. As shown in FIG. 4 of the drawing, prior to complete engagement of the male member with the female member, a cavity exists between the frusta-conical surface of the male member and the internal bores 39 and 35 of the retainer sleeve and retainer, respectively. Sea water from the internal bore or receiving chamber 37 of the female member will be displaced through the space, before full engagement. This keeps sea water entry into the hydraulic lines to a minimum. Most of the sea water will be displaced through the space before radial metal seal 28 or dovetail elastomeric seal 25 engage the outer circumference of the male member. Additionally, as the coupling members are disengaged, the space between the tapered body of the male member and the female member bore allows sea water to enter the cavity and thereby prevent hydraulic lock.

It will now be understood by those of skill in the art that an improved undersea hydraulic coupling may be made utilizing the present invention. Although variations in the embodiment of the present invention may not each realize all the advantages of the invention, certain features may become more important than others in various applications of the device. This invention, accordingly, should be understood to be limited only by the scope of the appended claims.

What is claimed is:

1. An undersea hydraulic coupling comprising:
   (a) a male member having a cylindrical body, a leading face, and a frusta-conical surface between the leading face and the cylindrical body, and having a valve for controlling fluid flow through the body; and
   (b) a female member having an internal bore for slidably receiving the male member therein, and a radial seal positioned in the bore for sealing with the frusta-conical surface of the male member body after seawater is expelled from the internal bore through the space between the internal bore and the frusta-conical surface of the male member.

2. The undersea hydraulic coupling of claim 1 wherein the radial seal is a pressure-energized metal seal.

3. The undersea hydraulic coupling of claim 1 wherein at least a portion of the internal bore in the female member is frusta-conical.

4. The undersea hydraulic coupling of claim 1 further comprising a seal retainer engageable with the female member for holding the radial seal in the bore when the coupling members are disengaged.

5. An undersea hydraulic coupling comprising:
   (a) a male member having a handle, a central portion and a leading face, the central portion having a cylindrical section and a frusta-conical section extending to the leading face, and a bore extending through the body with a valve in the bore for controlling fluid flow therethrough;
   (b) a female member having a receiving chamber for insertion of the male member therein, the receiving chamber having a frusta-conical section; the receiving chamber having at least one internal shoulder surface;

(c) at least one radial seal positioned on the internal shoulder surface, the radial seal engaging the frusta-conical section of the male member body and the frusta-conical section of the receiving chamber upon insertion of the male member into the receiving chamber; and (d) a seal retainer in the receiving chamber for holding the radial seal against the internal shoulder when the coupling members are separated.

6. The undersea hydraulic coupling of claim 5 wherein the radial seal is a hollow pressure-energized metal seal.

7. The undersea hydraulic coupling of claim 5 wherein the seal retainer comprises a retainer sleeve and a threaded retainer, and an elastromeric seal having a dovetail interfit between the retainer sleeve and threaded retainer.

8. The undersea hydraulic coupling of claim 5 wherein the seal retainer has an internal bore with a frusta-conical shape.

9. An undersea hydraulic coupling comprising:

(a) a male member having an internal bore extending from a first end to a second end thereof, the male member having a tapered outer surface adjacent the first end thereof, and a cylindrical outer surface adjacent the tapered outer surface;

(b) a female member having a stepped internal bore with a plurality of shoulder surfaces therein, a portion of the stepped internal bore being tapered and being dimensioned to correspond to the tapered outer surface of the male member adjacent the first end thereof; and (c) a radial seal positioned on one of the shoulder surface of the female member bore, the radial seal engaging the tapered outer surface of the male member when the male member is fully inserted into the stepped internal bore.

10. The undersea hydraulic coupling of claim 9 further comprising a plurality of radial seals, each of the seals positioned on a separate shoulder surface of the female member bore.

11. The undersea hydraulic coupling of claim 9 wherein the male member and the female member each have normally closed poppet valves for controlling fluid flow between the members.

12. The undersea hydraulic coupling of claim 9 further comprising a seal retainer with a tapered internal bore, the seal retainer abutting the radial seal to hold the seal in place upon separation of the coupling members.

* * * * *